United States Patent
Iyer et al.

(10) Patent No.: US 12,454,164 B2
(45) Date of Patent: Oct. 28, 2025

(54) HVAC DOOR WITH BLEED PORT

(71) Applicant: Hanon Systems, Daejeon (KR)

(72) Inventors: Jayanthi Iyer, Northville, MI (US); Michael R. Farris, Howell, MI (US); Senthil Raja Alagesan, Tamil Nadu (IN)

(73) Assignee: HANON SYSTEMS, Daejeon (KR)

( * ) Notice: Subject to any disclaimer, the term of this patent is extended or adjusted under 35 U.S.C. 154(b) by 374 days.

(21) Appl. No.: 18/048,301

(22) Filed: Oct. 20, 2022

(65) Prior Publication Data

US 2023/0147589 A1 May 11, 2023

Related U.S. Application Data

(60) Provisional application No. 63/263,824, filed on Nov. 10, 2021.

(51) Int. Cl.
*B60H 1/00* (2006.01)
*B60H 1/12* (2006.01)
*B60H 1/32* (2006.01)

(52) U.S. Cl.
CPC ..... *B60H 1/00671* (2013.01); *B60H 1/00564* (2013.01)

(58) Field of Classification Search
CPC ... B60H 1/00; B60H 1/12; B60H 1/32; B60H 1/00564; B60H 1/00671; B60H 1/00678
See application file for complete search history.

(56) References Cited

U.S. PATENT DOCUMENTS 6,889,761 B2 * 5/2005 Perry ................ B60H 1/00678
165/103

FOREIGN PATENT DOCUMENTS

| KR | 20020056999 A | 7/2002 | |
| KR | 20110126230 A | 11/2011 | |
| KR | 20150022099 A | 3/2015 | |
| WO | WO-2016111337 A1 * | 7/2016 | ............ B60H 1/00 |

OTHER PUBLICATIONS

English WO201611337 by PE2E Jan. 3, 2025.*

* cited by examiner

*Primary Examiner* — Deming Wan
(74) *Attorney, Agent, or Firm* — Shumaker, Loop & Kendrick, LLP; James D. Miller

(57) ABSTRACT

A fluid distribution door for an air-handling system of a heating, ventilating, and air conditioning system includes an air-directing wall having a first major surface and an oppositely arranged second major surface, a bleed port projecting from the second major surface of the air-directing wall, and a bleed path formed through the fluid distribution door. The bleed path extends through the air-directing wall and the bleed port.

7 Claims, 2 Drawing Sheets

HVAC DOOR WITH BLEED PORT

CROSS-REFERENCE TO RELATED APPLICATION

This patent application claims priority to U.S. Provisional Patent Application Ser. No. 63/263,824, filed on Nov. 10, 2021, the entire disclosure of which is hereby incorporated herein by reference.

FIELD OF THE INVENTION

The invention relates to a heating, ventilating, and air conditioning system for a vehicle, and more particularly to a fluid distribution door having a bleed port projecting therefrom.

BACKGROUND OF THE INVENTION

A vehicle typically includes a climate control system which maintains a temperature within a passenger compartment of the vehicle at a comfortable level by providing heating, cooling, and ventilation. Comfort may be maintained in the passenger compartment by an integrated system referred to as a heating, ventilating and air conditioning (HVAC) air-handling system. The HVAC air-handling system conditions air flowing therethrough and distributes the conditioned air throughout the passenger compartment. The design of an HVAC air-handling system includes features that control air flow volume, air temperature, and air flow pathways, for example. Performance of the HVAC air-handling system may comply with particular targets including temperature stratification and air-flow distribution between various outlet vents of the HVAC air-handling system disposed within the passenger compartment.

Many of the HVAC air-handling systems utilize an adjustable fluid distribution door for controlling the flow of air through the air-handling systems. The fluid distribution door is typically rotatable or translatable between a plurality of positions associated with a plurality of air flow patterns through the air-handling system, wherein each of the air flow patterns corresponds to a desired flow rate and/or temperature of the air through the desired vents of the air-handling system.

Such fluid distribution doors may be configured to distribute the conditioned air within the HVAC air-handling system to the vents disposed within the passenger compartment according to a selected mode of operation of the HVAC air-handling system. For example, a defrost mode of operation may include a majority of the conditioned air being delivered to various windshield or side window defrost vents instead of the floor or panel vents of the associated vehicle. One or more of the fluid distribution doors may be adjustable to determine the distribution of the air to each of these vents, wherein certain positions of the various fluid distribution doors promote airflow to certain vents in favor of other vents with respect to air previously conditioned within the HVAC air-handling system.

Certain modes of operation of the HVAC air-handling system may require that a relatively small amount of air is delivered to certain vents of the passenger compartment in order to maintain desired operation of the HVAC air-handling system within certain specifications. Such a relatively small flow of air is typically referred to as an air bleed, and the pathway followed by such an airflow is typically referred to as a bleed path or bleed pathway. Such a bleed path may be necessary to maintain a desired pressure, temperature, humidity, and/or flow rate of the previously conditioned air at various locations within the HVAC air-handling system as well as the passenger compartment, in accordance with the selected mode of operation.

One way to establish such a bleed path includes forming an opening through an air-directing wall of one of the fluid distribution doors responsible for distributing the air to the different vents of the passenger compartment. Such an opening may be a through hole extending from one major side of the air-directing wall to another major side of the air-directing wall or an indentation formed along a perimeter of the air-directing wall such that air can bypass the air-directing wall with respect to certain positions of the fluid distribution door that would otherwise be configured to restrict flow past the fluid-distribution door. Such a through hole or indentation may include an axial length equal to the thickness of the air-directing wall such that each of the opposing axial ends of the through hole or indentation is defined by an edge along one of the corresponding major sides of the air-directing wall.

One disadvantage of the use of such a through hole or peripheral indentation for forming the bleed path is that a flow of the air at the downstream end of the through hole or peripheral indentation cannot be controlled in a manner facilitating the desired distribution of the air to the vents of the passenger compartment. The manner in which the outlet end of the through hole or indentation opens up at an edge of the downstream arranged major surface of the air-directing wall results in the air being able to flow in any number of directions when exiting the through hole or indentation and passing by the downstream arranged edge, including the air flowing laterally relative to the axial direction of the through hole or the indentation, such as turning sharply immediately after passing through the fluid distribution door.

Such uncontrolled flow of the air exiting the through hole or indentation at the downstream arranged major side of the air-directing wall is particularly disadvantageous when multiple different vents are arranged downstream of and in fluid communication with the corresponding fluid distribution door. For example, there may be circumstances wherein a duct leading to a vent through which the air bleed is desirably directed is arranged substantially in the axial direction of the through hole or indentation while another duct leading to a vent through which the air bleed is not desired is arranged laterally to the axial direction of the through hole or indentation. An uncontrolled lateral flow of the air when exiting the through hole or indentation can accordingly result in an undesired quantity of this air flowing laterally towards the undesired duct for delivery to a vent not normally associated with receiving the air bleed during the selected mode of operation. Such a condition can disadvantageously lead to a passenger of the vehicle experiencing an undesirable flow of air through vents that are not associated with the selected mode of operation, which can falsely give the impression of a failed operation of the HVAC air-handling system in achieving the selected mode of operation.

It would therefore be desirable to produce a fluid distribution door having a bleed path with a predictably controlled flow of an air bleed passing therethrough for distributing the air bleed to the vents of the passenger compartment in accordance with the selected mode of operation of the corresponding HVAC air-handling system.

SUMMARY OF THE INVENTION

Concordant and consistent with the present invention, an improved fluid distribution door having a bleed port for controlling an air bleed has surprisingly been discovered.

In one embodiment, a fluid distribution door for an air-handling system of a heating, ventilating, and air conditioning system includes an air-directing wall having a first major surface and an oppositely arranged second major surface, a bleed port projecting from the second major surface of the air-directing wall, and a bleed path formed through the fluid distribution door. The bleed path extends through the air-directing wall and the bleed port.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
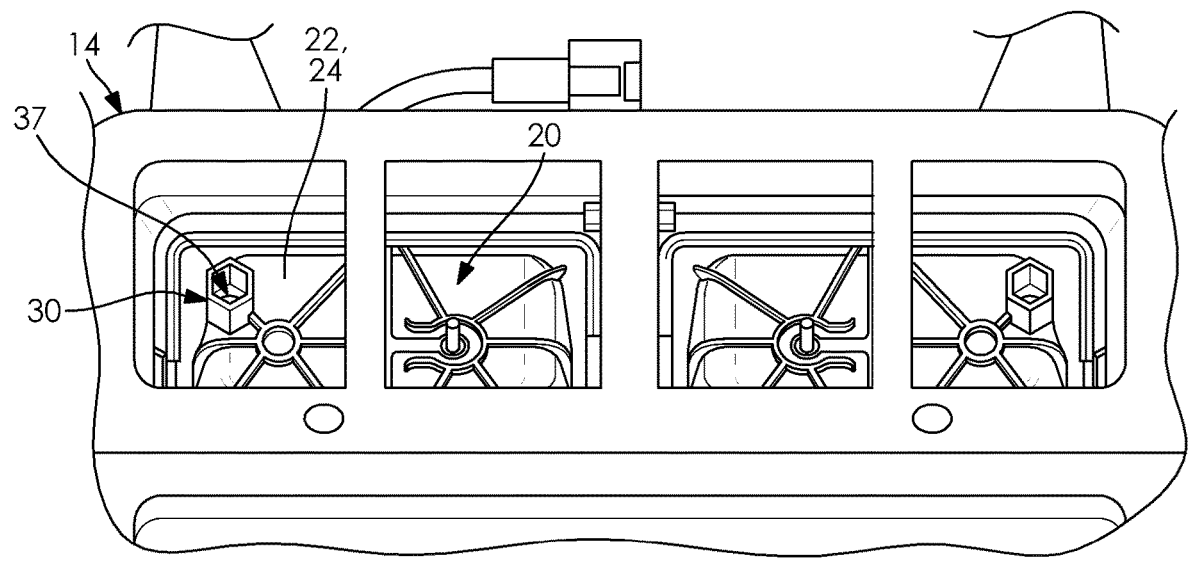
FIG. 1 is a perspective view of an HVAC air handling system having a fluid distribution door according to an embodiment of the present invention.
Figure 2:
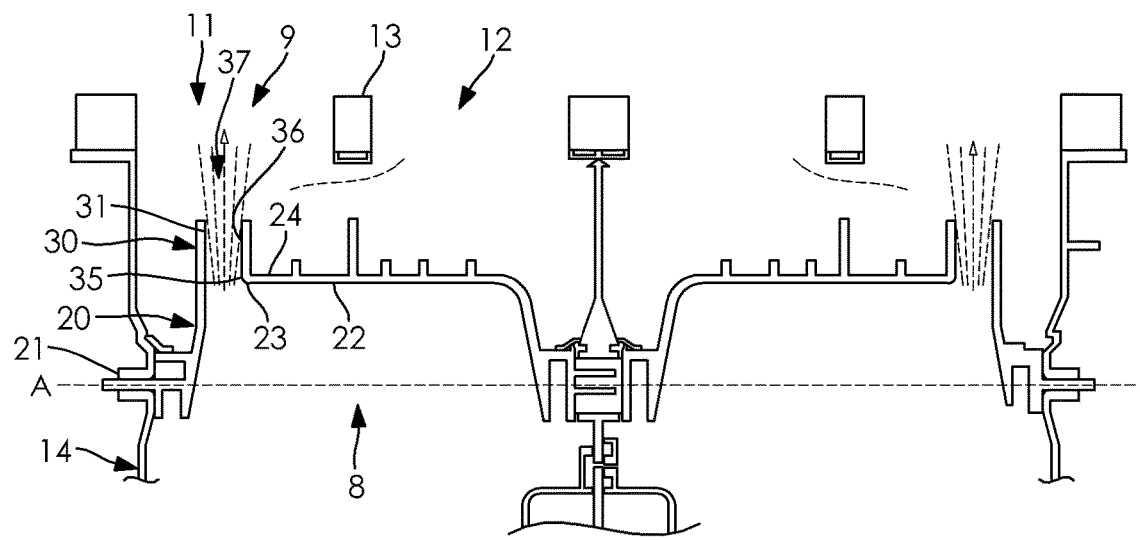
FIG. 2 is cross-sectional view of the HVAC air-handling system of FIG. 1.
Figure 3:
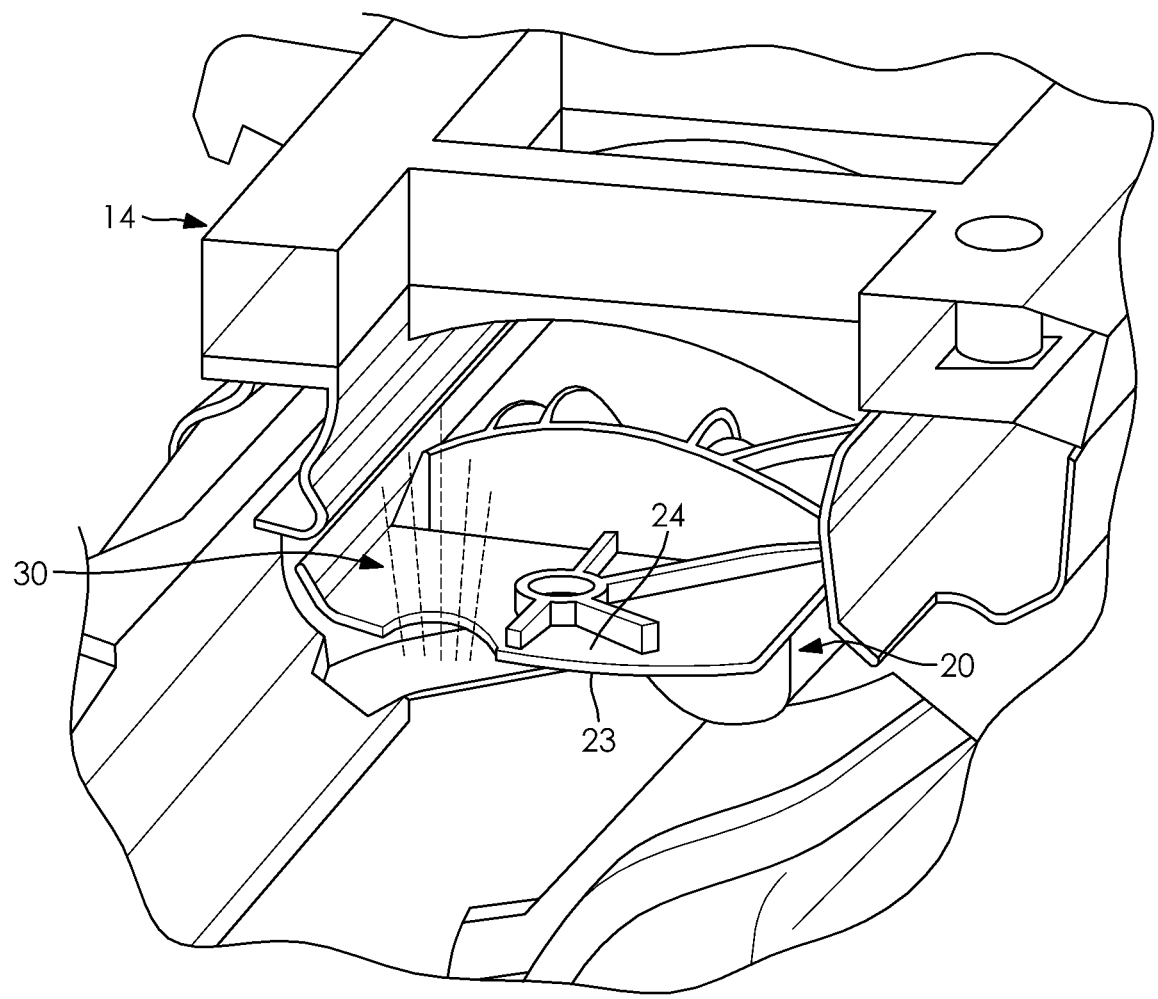
FIG. 3 is a partial cross-sectional view of the HVAC air-handling system of FIG. 1.

FIGS. 1-3 illustrate a fluid distribution door 20 for use in an air-handling system of a heating, ventilating, and air conditioning (HVAC) system for a vehicle (not shown) according to an embodiment of the invention. The air-handling system is also commonly referred to as an HVAC air-handling system. The air-handling system typically provides heating, ventilation, and air conditioning for a passenger compartment (not shown) of the vehicle.

The air-handling system includes a housing 14 for conveying a flow of air therethrough. The housing 14 may include an inlet section (not shown), a conditioning section (not shown), a mixing section 8, and a delivery section 9. The supply of air can be provided from outside of the vehicle, recirculated from the passenger compartment of the vehicle, or a mixture of the two, for example. The conditioning section may include heat exchangers such as an evaporator core (not shown) and a heater core (not shown) for controlling a temperature and a humidity of the supply of the air to be distributed to the vents of the motor vehicle. The air exiting the conditioning section flows into the mixing section 8 where the air is mixed before being distributed to the vents of the motor vehicle via the delivery section 9. The delivery section 9 may include a plurality of fluid ducts leading to various different vents of the passenger compartment of the motor vehicle. For example, a first duct may lead to one or more windshield defrost vents (not shown) and one or more side window defrost vents (not shown), a second duct may lead to one or more panel vents (not shown) and one or more console vents (not shown), and a third duct may lead to one or more front floor vents (not shown) and one or more rear floor vents (not shown). However, it should be understood that various other configurations of the fluid ducts leading to various different vents of the air handling system may be used without departing from the scope of the present invention.

The fluid distribution door 20 includes a bleed port 30 according to an embodiment of the present invention. The bleed port 30 is configured to direct an air bleed encountering the fluid distribution door 20 towards the desired fluid ducts for delivering the air to the desired vents within the passenger compartment. The bleed port 30 is further configured to restrict an amount of the air bleed flowing towards fluid ducts that are not intended to receive the air bleed via the fluid distribution door 20. The bleed port 30 is therefore configured to ensure that a greater distribution of the air flowing through the bleed port 30 is delivered to the desired fluid ducts and corresponding vents of the passenger compartment.

The housing 14 is shown in FIGS. 1-3 as being formed into a pair of lateral sections with each of the lateral sections associated with delivering air to a specific portion of the passenger compartment, such as the driver side or the passenger side of the passenger compartment. The lateral sections are symmetrically arranged relative to each other and generally include the same structure, hence the fluid distribution door 20 is described hereinafter with reference to only one of the lateral sections. It should be apparent that the beneficial features of the bleed port 30 of the present invention may be applied to a housing 14 that is divided into any number of different sections or compartments while remaining within the scope of the present invention.

The fluid distribution door 20 includes at least one shaft portion 21 defining an axis of rotation A of the fluid distribution door 20 about which an air-directing wall 22 thereof is configured to rotate. The air-directing wall 22 refers to a portion of the fluid distribution door 20 that is adjustable relative to the housing 14 in order to control a flow of air encountering the fluid distribution door 20. The air-directing wall 22 may be configured to adjust a flow cross-section through the housing 14 (including blocking off a flow path through the housing 14) or may be utilized to control a flow direction of the air passing over the air-directing wall 22.

However, the fluid distribution door 20 is not limited to a configuration including a rotatable connection to the housing 14. For example, the fluid distribution door 20 may instead be slidably coupled to the housing 14 with the corresponding air-directing wall 22 configured to be slidable relative to a flow path through the housing 14 for adjusting the flow cross-section therethrough or for directing the air passing over the air-directing wall 22 in a specified direction.

It should also be apparent that the bleed port 30 of the present invention may be incorporated into alternative configurations of the fluid distribution door 20 in addition to those described while remaining within the scope of the present invention, so long as the bleed port 30 maintains the same general relationships relative to the structure of the fluid distribution door 20 and the housing 14 as described hereinafter.

The air-directing wall 22 having the bleed port 30 includes a first major surface 23 corresponding to an upstream arranged side of the air-directing wall 22 and a second major surface 24 corresponding to a downstream arranged side of the air-directing wall 22, wherein a thickness of the air-directing wall 22 is measured between opposing portions of the major surfaces 23, 24. In the present example, the upstream arranged first major surface 23 generally faces towards the mixing section 8 from which the bleed air originates while the downstream arranged second major surface 24 generally faces towards the delivery section 9 having the fluid ducts for delivery of the air bleed to the passenger compartment of the vehicle. In the present example, the delivery section 9 includes each of a first fluid duct 11 and a second fluid duct 12 arranged downstream of the fluid distribution door 20 and separated from each other by a dividing wall 13, wherein it is assumed that the first fluid duct 11 leads to different vent of the passenger compartment than the second fluid duct 12.

The bleed port 30 is provided as a fluid conduit or tube projecting away from the second major surface 24 of the air-directing wall 22 with the bleed port 30 axially aligned with and extending away from a first opening 35 formed through the air-directing wall 22. The bleed port 30 includes a circumferential wall 31 projecting away from the second major surface 24 in an axial direction of the bleed port 30, wherein the circumferential wall 31 defines a second opening 36. The bleed port 30 may be formed integrally with the air-directing wall 22, meaning that the bleed port 30 and the air-directing wall 22 may be monolithically formed in a common manufacturing process, such as a suitable molding or casting process.

A bleed path 37 formed through the fluid distribution door 20 accordingly includes the air bleed passing through the first opening 35 formed through the air-directing wall 22 and the second opening 36 formed through the bleed port 30, wherein the second opening 36 extends from the first opening 35. The first opening 35 extends axially from the first major surface 23 to a position where the bleed port 30 projects from the second major surface 24 and therefore includes an axial length equal to a thickness of the air-directing wall 22 immediately adjacent and surrounding the bleed port 30. The second opening 36 includes an axial length equal to a distance present between a distal end of the bleed port 30 and a position where the bleed port 30 projects away from the second major surface 24.

In the illustrated embodiment, the circumferential wall 31 is shown as having a hexagonal cross-sectional shape that is constant with respect to the axial direction of the bleed port 30. However, the circumferential wall 31 may include substantially any closed cross-sectional shape suitable for passing the air bleed therethrough while remaining within the scope of the present invention, including the use of a rectangular cross-section, an elliptical cross-section, or combinations thereof, as non-limiting examples. The circumferential wall 31 is also not constrained to including a constant cross-section extended exclusively in a single axial direction, and may instead form a curved or arcuate path when projecting away from the second major surface 24, as desired.

The bleed path 37 formed through the fluid distribution door 20 accordingly includes a greater flow length than that of the first opening 35, which when considered alone includes a flow length equal to the thickness of the air-directing wall 22 at the position of the bleed port 37. The inclusion of the bleed port 30 projecting from the second major surface 24 of the fluid distribution door 20 accordingly increases a flow length of the bleed path 37 through the fluid distribution door 20 in comparison to the exclusive use of a through hole extending between the opposing major surfaces 23, 24. This increase in the flow length of the bleed path 37 leads to the air bleed exiting the bleed path 37 having a greater tendency to flow in the longitudinal (in the present case, axial) direction of the bleed path 37 as defined by the direction of extension of the bleed port 30, which allows for a greater control of the directionality of the air bleed exiting the bleed path 37 at the distal end of the bleed port 30 in comparison to the use of the through hole having a considerably shorter flow length equal to the thickness of the air-directing wall 22.

The bleed port 30 may include an axial or longitudinal length that is equal to or greater than a maximum diameter of the bleed path 37 within either of the first opening 35 or the second opening 36. The bleed port 30 may include an axial or longitudinal length that is at least as great as a thickness of the air-directing wall 22 at the position of the bleed path 37. The bleed port 30 may extend a distance from the second major surface 24 such that the bleed path 37 including each of the openings 35, 36 includes a flow length that is greater than the flow length through the first opening 35 alone, including the total combined flow length of the bleed path 37 being a multiple of the flow length through the first opening 35, such as being at least twice as long, at least three times as long, and so on.

If a rotable fluid distribution door 20 is utilized, the bleed port 30 may project away from the second major surface 24 in a direction transverse to the axis of rotation A of the fluid distribution door 20, such as a direction arranged perpendicular to the axis of rotation A. However, the bleed port 30 may project at least partially in the direction of the axis of rotation A, as desired, for imparting the desired directionality to the air bleed exiting the bleed port 30. If a translatable fluid distribution door 20 is utilized, the bleed port 30 may project away from the second major surface 24 in a direction transverse to a direction of sliding of the fluid distribution door 20.

As best shown in FIG. 2, the extension of the bleed port 30 away from the second major surface 24 results in the air bleed passing through the bleed path 37 flowing primarily in the axial direction of the bleed port 30 to ensure that a greater distribution of the air bleed flows towards the first fluid duct 11 rather than the second fluid duct 12. That is, the bleed port 30 biases the flow of the air bleed exiting the bleed path 37 of the fluid distribution door 20 towards the first fluid duct 11 rather than the second fluid duct 12, thereby ensuring that a greater percentage of the air bleed flows to the first fluid duct 11 than the second fluid duct 12, which in turn leads to the same relationship at the associated vents of the passenger compartment. A distance between the end of the bleed path 37 and the inlet into the first fluid duct 11 is also shortened in comparison to the use of a through hole alone, which further ensures that the air flows towards the favored one of the ducts 11, 12.

The inclusion of the bleed port 30 advantageously allows for improved control of the air bleed passing through the corresponding fluid distribution door 20, which in turn allows for the air bleed to be delivered to the passenger compartment in accordance with the selected mode of operation of the HVAC air-handling system and the desired specifications of the selected mode of operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. An HVAC air-handling system comprising:
a housing comprising:
an inlet,
a conditioning section downstream of the inlet,
a mixing section downstream of the conditioning section, and
a delivery section downstream of the mixing section, comprising:

a fluid distribution door comprising:
an air-directing wall having a first major surface and an oppositely arranged second major surface;
a bleed port projecting from the second major surface of the air-directing wall; and
a bleed path formed through the fluid distribution door, the bleed path extending through the air-directing wall and the bleed port, wherein the bleed path is continuously open and independent of an operation of the fluid distribution door, and wherein the delivery section comprises a plurality of fluid ducts and the fluid distribution door is disposed downstream of the mixing section.

2. The HVAC air-handling system according to claim 1, wherein the conditioning section comprises at least one of a heat exchanger, an evaporator, and a heater core.

3. The HVAC air handling system of claim 1, wherein the first major surface of the fluid distribution door is an upstream arranged surface of the fluid distribution door and the second major surface is a downstream arranged surface of the fluid distribution door.

4. The HVAC air handling system according to claim 1, wherein the bleed path of the fluid distribution door includes a first opening extending between the first major surface and the second major surface within the air-directing wall and a second opening extending within the bleed port.

5. The HVAC air handling system according to claim 1, further comprising at least one shaft portion coupled to the housing defining an axis of rotation, wherein the air-directing wall is configured to rotate about the axis of rotation.

6. The HVAC air handling system according to claim 1, wherein the air-directing wall of the fluid distribution door is slidably coupled to the housing.

7. The HVAC air handling system of claim 1, wherein the bleed path remains continuously open regardless of movement of the air-directing wall throughout an entirety of operation of the fluid distribution door.

* * * * *